United States Patent

[11] 3,600,610

[72] Inventors Robert J. Kelsch
Penfield;
Paul F. Schmitt, Walworth, both of, N.Y.

[21] Appl. No. 862,555
[22] Filed July 9, 1969
Division of Ser. No. 596,281, Nov. 26, 1966, Pat. No. 3,495,904
[45] Patented Aug. 17, 1971
[73] Assignee Xerox Corporation
Rochester, N.Y.

[54] TIME DELAY CIRCUIT FOR A RADIANT ENERGY PROTECTIVE APPARATUS
2 Claims, 2 Drawing Figs.

[52] U.S. Cl. .......... 307/293, 307/141.4, 317/142 TD, 328/131
[51] Int. Cl. .......... H03k 17/28
[50] Field of Search .......... 307/293, 85, 86, 94, 141, 141.4, 294, 201; 317/141, 142, 33, 36; 328/129, 131

[56] References Cited
UNITED STATES PATENTS

| | | | |
|---|---|---|---|
| 3,119,027 | 1/1964 | Faust .......... | 307/293 |
| 3,466,464 | 9/1969 | Putterbaugh et al. .......... | 307/293 X |
| 3,493,789 | 2/1970 | Sether .......... | 307/293 |

*Primary Examiner*—Stanley D. Miller, Jr.
*Attorneys*—James J. Ralabate, Norman E. Schrader and Ronald Zibelli

ABSTRACT: This invention relates to document motion detention devices and, more particularly, to protection of original documents from burning or tearing in graphic information scanning and transporting systems. A time delay circuit is provided wherein a switch is continuously energized and deenergized to control the operation of associated circuitry for the external control of a lamp or other control circuitry. If this switch remains opened or closed for a length of time due to a malfunction within the external control circuitry, the time delay circuit would deenergize said external circuitry to prevent damage to said original documents.

INVENTORS
ROBERT J. KELSCH
PAUL F. SCHMITT
BY Franklyn C. Weiss
ATTORNEY

TIME DELAY CIRCUIT FOR A RADIANT ENERGY PROTECTIVE APPARATUS

This is a division of application Ser. No. 596,281, filed Nov. 22, 1966, now U.S. Pat. No. 3,495,904.

BACKGROUND

In facsimile systems or in office copy machines, it is customary to have relative motion between an original document and a source of scanning rays. The scanning rays are scanned in some predetermined fashion across the document for subsequent utilization thereof, i.e., transmission or recreation of the original document. The brighter the image scanning rays become the more responsive and selective may be the detection system. With a low powered source of image scanning rays, the detection system must of necessity be more sensitive, which inherently adds noise or other undesirable effects to the output signal therefrom.

It is desirable, therefore, to use as high an energy exposure lamp as is possible without causing damage to the original document. Such a high powered source of rays is desirable in that information detection becomes less complex with the additional advantage of higher resolution and information density. If, however, a paper jam occurs in the machine, whether a facsimile scanning device or office copying machine, the danger arises of the effect of the extreme heat radiated by the high energy exposure lamp. As an original document may be difficult to replace, it is highly desirable to deenergize the exposure lamp and/or the transport system as quickly as the jam is detected so as to prevent scorching, burning or tearing of the original document. One prior art solution to this situation is to continually monitor by mechanical means the movement of the document through the mechanical transport. Such a system is undesirable, however, as different size paper or torn or mutilated sheets may be used which render the mechanical detection device inoperative. If such a jam would occur with an unreliable jam detector, the possibility arises of the original document being destroyed due to the heat energy radiated by the high energy exposure lamp or tearing by continual movement of the transport system.

OBJECTS

It is, accordingly, an object of the present invention to protect an original document from burning, scorching and tearing in a graphic scanning system.

It is another object of the present invention to deenergize the high energy exposure lamp when a paper jam occurs in an information scanning system.

It is another object of the present invention to detect paper jams in information scanning systems regardless of the size and condition of the document.

It is another object of the present invention to detect the motion of any flat, or relatively flat material through a transport system.

BRIEF SUMMARY OF THE INVENTION

In accomplishing the above and other desired aspects, applicant has invented novel apparatus for deenergizing a high energy exposure lamp in a graphic information scanning system upon detection of a paper jam therein. As a document is moving through the document transport system, a multinoded cam on the end of a paper follower roll opens and closes in rapid succession a microswitch electrically connected to the input of a timing circuit. As the follower cam shaft rotates, the circuit continually allows the line power to energize the high energy illumination source. Upon a paper jam, however, the follower roll will discontinue revolving, thus interrupting the operation of the cam and microswitch operation. A finite time after this discontinuance of operation, the timing circuit will disconnect the power source, thus deenergizing the illumination lamp. In this manner, the document is safe from burning or scorching until the paper jam in the machine can be corrected.

BRIEF DESCRIPTION OF THE DRAWINGS

For a more complete understanding of the invention, as well as other objects and further features thereof, reference may be had to the following detailed description in conjunction with the drawings wherein.

DETAILED DESCRIPTION

Figure 1:
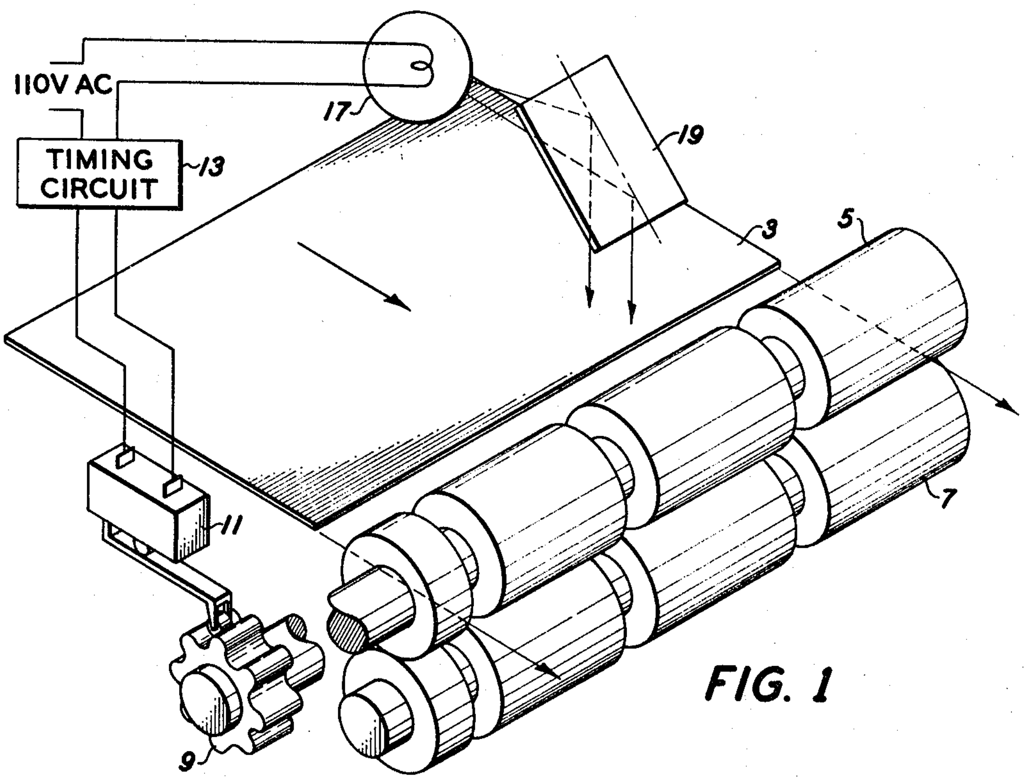
FIG. 1 is an isometric diagram of the radiant energy protection device in accordance with the principles of the present invention.

Referring now to FIG. 1, there is shown part of a paper feed mechanism for use in apparatus such as a facsimile scanning system or an office copier machine. The lower roll 7 rotates in a clockwise direction as shown by the arrow, by a motor, not shown, and in turn revolves the upper or follower roller 3, which is in intimate contact with the lower roll 7. When a document 3 is fed through the rollers, the document itself provides the friction between the lower roll 7 and the upper or follower roll 5 to allow the top roller to turn.

At one end of the upper or follower roll 5 is a cam 9 with a predetermined number of cam nodes. In conjunction with the cam nodes is a microswitch 11 such that the switch is energized every time a node comes in contact with the armature of the switch 11. The continuous switching of the switch 11 energizes the timing circuit 13 which allows the 110 volt AC or other power supply to energize the high energy exposure lamp 17. The rays from the lamp 17 impinge upon reciprocating or stationary mirror 19 or directly to scan document 3 by any of the known techniques.

There is a time delay of predetermined amount in timing circuit 13. Thus, if the paper document is moving through the system in a normal manner the lower roll 7 via the document 3 turns the upper roll 5 and thus cam 9. In this manner the microswitch 11 is continually opened and closed thereby energizing timing circuit 13 which allows the lamp 17 to continuously illuminate the document. If, however, the paper jams in any manner, the follower roll 5 will stop rotating because the paper itself is not moving through the rollers. In this situation cam 9 no longer operates the microswitch 11 and after the predetermined time delay the timing circuit 13 will deenergize the lamp 17, thus preventing any scorching or burning of the document. If the jam clears itself and the document starts to move again through the system, the cam 9 once again activates microswitch 11 and timing circuit 13 allows lamp 17 to be illuminated again.

If it is desired, the timing circuit could also be used to deenergize the transporting system in addition to the illumination lamp. In this instance, the document would be protected not only from burning or scorching but also from tearing or ripping by the moving roller 7.

It is to be noted that the configuration of FIG. 1 is drawn to a scanning system in a facsimile or office copier machine. The invention has further utilization in a system wherein roll heaters are used in a fusing application to fix xerographic images. The invention would operate in a similar manner in that if the document with the electrostatic image in the form of toner particles passes through a roll heater device, the paper protective device will protect a paper jam and disconnect the electric current through the heaters, saving the document from scorching or burning. Further, in FIG. 1 it is to be understood that the upper roll 5 would be allowed limited travel in a vertical direction to compensate for the thickness of the document paper. The distance that the upper roll 5 moves would not affect the operation of the switch because of the configuration of the cam and the small distance the roll might move in response to different paper thicknesses.

Figure 2:
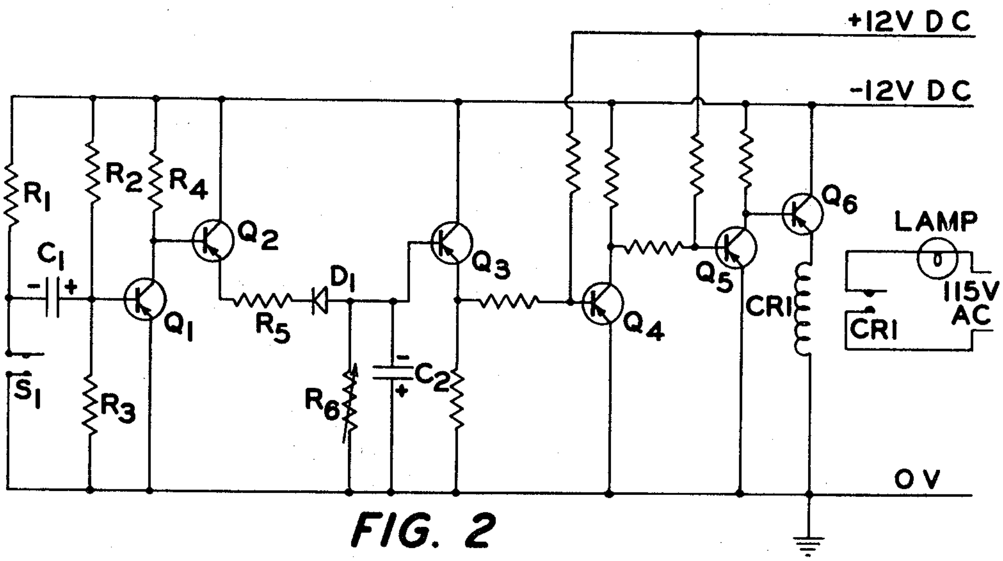
FIG. 2 is a schematic diagram of the timing circuit as shown and described in conjunction with FIG. 1.

In FIG. 2 is shown the timing circuit 13 used for detecting a paper jam and for deenergizing the lamp 17. With $S_1$ designating the microswitch of FIG. 1, it can be seen that when $S_1$ opens, $C_1$ charges through $R_1$ toward −12 volts, for example, with the polarity as shown in FIG. 2. When $S_1$ closes, the charge on the side of the capacitor $C_1$ designated with a minus sign is forced to zero volts potential due to the connection from ground to that side of the capacitor. The positive potential side of $C_1$ is raised to a positive voltage equal to the potential that $C_1$ had been charged prior to operation of the microswitch. This positive voltage, applied to the base of transistor $Q_1$, inhibits its conduction and therefore the collector of $Q_1$ would be at −12 volts DC due to such nonconduction. Transistor $Q_2$ wired as an emitter-follower, will then charge capacitor $C_2$ toward −12 volts through resistor $R_5$ and diode $D_1$. $C_1$ is charging toward a voltage determined by resistor $R_2$ and $R_3$. This voltage allows transistor $Q_1$ to conduct and now its collector would approach 0 volts. Transistor $Q_2$ as the emitter-follower, would not transfer such voltage to capacitor $C_2$ as diode $D_1$ is now reversed biased. Capacitor $C_2$ thus stores the voltage previously impressed upon it for the length of time determined by the R-C time constant of $C_2$ and $R_6$.

The voltage on $C_2$ is transferred by transistor $Q_3$, also wired as an emitter-follower, to bias transistor $Q_4$ into conduction. The output of $Q_4$ is inverted by transistor $Q_5$ to enable transistor $Q_6$ to conduct and energize relay $CR_1$. The contacts of the relay $CR_1$ supply the power to the lamp 17 as long as the relay coil $CR_1$ is energized. $C_2$ however, must be recharged before discharging to a level which results in the deenergizing of relay $CR_1$. Capacitor $C_2$ is recharged by coupling a voltage transient through capacitor $C_1$ which would now be energized again by the next cam lobe, which indicates that document motion still exists. If switch $S_1$ remains either opened or closed for a length of time longer than the time determined by $C_2$ and $R_6$, relay $CR_1$ would be deenergized. The time constant may be adjusted by varying $R_6$ and/or $C_2$.

In the foregoing, there has been disclosed apparatus for disabling a high energy exposure lamp upon detection of a paper jam in an optical scanning system. The invention has been described in conjunction with the detection and protection of a document in a graphic information system but it is apparent that the invention could be utilized to detect and protect the movement of any flat material through a transport system. While the present invention, as to its objects and advantages, as described herein, has been set forth in specific embodiments thereof, they are to be understood as illustrative only and not limiting.

What we claim is:

1. A timing circuit comprising:

a first capacitor coupled to a source of negative voltage, a normally open switch coupled to said capacitor for selectively connecting said negatively charged capacitor to a common ground, thereby shifting the voltage potential across said capacitor, a first transistor coupled to said first capacitor responsive to said shifted voltage level for electronically switching to a nonconducting state, a second transistor responsive to the conduction of said first transistor for establishing an electrical charging path to the source of negative voltage, a diode coupled to said second transistor, a second capacitor coupled to said diode for storing the negative source voltage on said second transistor when said transistor is in said nonconducting state whereby said diode is forward biased, a resistor connected in parallel with said second capacitor for discharging said stored voltage at a predetermined rate when said switch is placed in its normally open position thereby switching said first transistor to a conducting area and said diode is back biased due to the second transistor being switched to its nonconducting state, a third transistor responsive to the stored voltage on said second capacitor for electronically switching to a nonconducting state when said voltage falls below a predetermined level, and means coupled to said third transistor for selectively deenergizing a pair of output terminals, in response to said nonconducting state of said third transistor, a predetermined amount of time after said switch remains in its normally open position or is held in the closed position.

2. A timing circuit comprising:

a first capacitor coupled to a source of negative voltage, a normally open switch coupled to said capacitor for selectively connecting said negatively charged capacitor to a common ground, thereby shifting the voltage potential across said capacitor, a first transistor coupled to said first capacitor responsive to said shifted voltage level for electronically switching to a nonconducting state, a diode coupled to said first transistor, a second capacitor coupled to said diode for storing the negative source voltage on said first transistor when said transistor is in said nonconducting state whereby said diode is forward biased, a resistor connected in parallel with said second capacitor for discharging said stored voltage at a predetermined rate when said switch is placed in its normally open position thereby switching said first transistor to a conducting state and said diode is back biased, a second transistor responsive to the stored voltage on said second capacitor, for electronically switching to a nonconducting state when said voltage falls below a predetermined level, and means coupled to said second transistor for selectively energizing a pair of output terminals until said switch remains in its normally open position or is held in the closed position for a predetermined amount of time.

PO-1050
(5/69)

UNITED STATES PATENT OFFICE
CERTIFICATE OF CORRECTION

Patent No. 3,600,610 Dated August 17, 1971

Inventor(s) Robert J. Kelsch et al

It is certified that error appears in the above-identified patent and that said Letters Patent are hereby corrected as shown below:

Column 4, line 14, "area" should be --state--.

Column 4, line 46, delete the comma.

Signed and sealed this 20th day of June 1972.

(SEAL)
Attest:

EDWARD M.FLETCHER,JR.
Attesting Officer

ROBERT GOTTSCHALK
Commissioner of Patents